(12) United States Patent
Nozaki

(10) Patent No.: US 10,738,723 B2
(45) Date of Patent: Aug. 11, 2020

(54) CONTROLLER OF A TURBOCHARGED ENGINE

(71) Applicant: TOYOTA JIDOSHA KABUSHIKI KAISHA, Toyota-shi, Aichi-ken (JP)

(72) Inventor: Tomohiro Nozaki, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 351 days.

(21) Appl. No.: 15/854,887

(22) Filed: Dec. 27, 2017

(65) Prior Publication Data

US 2018/0245531 A1 Aug. 30, 2018

(30) Foreign Application Priority Data

Feb. 27, 2017 (JP) ................. 2017-035115

(51) Int. Cl.
| | |
|---|---|
| *F02D 41/00* | (2006.01) |
| *F02D 41/04* | (2006.01) |
| *F02M 26/07* | (2016.01) |
| *F02M 35/10* | (2006.01) |

(52) U.S. Cl.
CPC ....... *F02D 41/0077* (2013.01); *F02D 41/005* (2013.01); *F02D 41/0007* (2013.01); *F02D 41/045* (2013.01); *F02M 26/07* (2016.02); *F02M 35/1038* (2013.01); *F02D 2200/0406* (2013.01)

(58) Field of Classification Search
CPC .............. F02D 41/0077; F02D 41/045; F02D 41/0007; F02D 41/005; F02D 2200/0406; F02M 26/07; F02M 35/1038
See application file for complete search history.

(56) References Cited

U.S. PATENT DOCUMENTS

| | | | |
|---|---|---|---|
| 6,973,785 B2* | 12/2005 | Umehara | .............. F02D 41/005 123/568.11 |
| 2006/0137660 A1 | 6/2006 | Shirakawa et al. | |

FOREIGN PATENT DOCUMENTS

| | | |
|---|---|---|
| JP | 2005-307804 A | 11/2005 |
| JP | 2006-183558 A | 7/2006 |
| JP | 2010-112219 A | 5/2010 |
| JP | 2010-120472 A | 6/2010 |

* cited by examiner

*Primary Examiner* — Laert Dounis
*Assistant Examiner* — Edward Bushard
(74) *Attorney, Agent, or Firm* — Sughrue Mion, PLLC

(57) ABSTRACT

An internal-combustion engine includes: a supercharger; an EGR passage connecting between an exhaust passage and an intake passage downstream of the supercharger; a control device controlling EGR; and an intake pressure sensor that detects a supercharge pressure being a gas pressure in the intake passage downstream of the supercharger. A comparison-target pressure is a higher one of a target supercharge pressure and an actual supercharge pressure detected by the intake pressure sensor. The control device compares the comparison-target pressure with an exhaust gas pressure in the exhaust passage. When the comparison-target pressure is higher than the exhaust gas pressure, the EGR is prohibited and an EGR valve is fully closed. When the comparison-target pressure is lower than the exhaust gas pressure, the EGR is permitted.

6 Claims, 10 Drawing Sheets

CONTROLLER OF A TURBOCHARGED ENGINE

BACKGROUND

Technical Field

The present disclosure relates to an internal-combustion engine provided with an EGR (Exhaust Gas Recirculation) device.

Background Art

EGR device of an internal-combustion engine is provided for recirculating a portion of exhaust gas from an exhaust passage to an intake passage. Techniques disclosed in the following Patent Literatures 1 to 4 are known as conventional techniques relating to the EGR device.

Patent Literature 1 discloses an intake device of an internal-combustion engine. The intake device is provided with a turbocharger and an EGR device. The turbocharger includes a compressor provided in an intake passage and a turbine provided in an exhaust passage. The EGR device connects between the exhaust passage downstream of the turbine and the intake passage downstream of the compressor, and recirculates a portion of exhaust gas from downstream of the turbine to downstream of the compressor.

Patent Literature 2 discloses an EGR control device of an internal-combustion engine. The EGR control device performs EGR control during acceleration of a vehicle. More specifically, upon receiving an acceleration request, the EGR control device first closes an. EGR valve. After confirming that the EGR valve is completely closed, the EGR control device opens a throttle valve to a requested opening degree.

Patent Literature 3 discloses a control device for an engine. Upon detecting deceleration of a vehicle, the control device performs fuel cut control that decreases a fuel injection amount. The control device closes an EGR valve in conjunction with the fuel cut control. More specifically, the control device closes the EGR valve at the beginning of the fuel cut control and opens the EGR valve after elapse of a predetermined delay time.

Patent Literature 4 discloses an exhaust gas pressure estimation device that estimates an exhaust gas pressure used for estimating an internal EGR amount.

LIST OF RELATED ART

Patent Literature 1: Japanese Laid-Open Patent Publication No. 2010-112219
Patent Literature 2: Japanese Laid-Open Patent Publication No. 2010-120472
Patent Literature 3: Japanese Laid-Open Patent Publication No. 2006-183558
Patent Literature 4: Japanese Laid-Open Patent Publication No. 2005-307804

SUMMARY

In the above-mentioned Patent Literature 1, the EGR device is configured to recirculate a portion of the exhaust gas to the intake passage downstream of the compressor. Here, let us consider a situation where an intake gas pressure downstream of the compressor (i.e. a supercharge pressure) is higher than an exhaust gas pressure. If the EGR valve is open under the situation, a portion of the intake gas downstream of the compressor flows back through an EGR passage to be output to the exhaust passage side. In this case, the amount of fresh air introduced into a cylinder decreases and thus performance degradation such as torque reduction and the like is caused.

An object of the present disclosure is to provide a technique that can prevent intake gas downstream of a supercharger from flowing back through an EGR passage.

A first disclosure provides an internal-combustion engine. The internal-combustion engine includes:
a supercharger;
an EGR passage connecting between an exhaust passage and an intake passage downstream of the supercharger through an EGR valve;
a control device that controls EGR that recirculates a portion of exhaust gas from the exhaust passage to the intake passage through the EGR passage; and
an intake pressure sensor that detects a supercharge pressure being a gas pressure in the intake passage downstream of the supercharger:
A target value of the supercharge pressure is a target supercharge pressure.
The supercharge pressure detected by the intake pressure sensor is an actual supercharge pressure.
The control device performs:
acquisition processing that acquires the target supercharge pressure, the actual supercharge pressure, and an exhaust gas pressure in the exhaust passage;
determination processing that makes a comparison between the exhaust gas pressure and a comparison-target pressure being a higher one of the target supercharge pressure and the actual supercharge pressure;
prohibition processing that prohibits the EGR and fully closes the EGR valve, when the comparison-target pressure is higher than the exhaust gas pressure; and
permission processing that permits the EGR, when the comparison-target pressure is lower than the exhaust gas pressure.

A second disclosure further has the following feature in addition to h first disclosure.
The internal-combustion engine further includes a catalytic converter disposed in the exhaust passage.
The catalytic converter is disposed downstream of a position at which the EGR passage and the exhaust passage are connected to each other.

A third disclosure further has the following feature in addition to the first or second disclosure.
When the comparison-target pressure becomes higher than the exhaust gas pressure during acceleration of a vehicle on which the internal-combustion engine is mounted, the control device starts the prohibition processing.

A fourth disclosure further has the following feature in addition to the third disclosure.
When starting the prohibition processing, the control device immediately decreases a target opening degree of the EGR valve to zero.

A fifth disclosure further has the following feature in addition to any one of the first to fourth disclosures.
When the comparison-target pressure becomes lower than the exhaust gas pressure during deceleration of a vehicle on which the internal-combustion engine is mounted, the control device opens the EGR valve to start the EGR.

A sixth disclosure further has the following feature in addition to the fifth disclosure.
When starting the EGR, the control device gradually increases a target opening degree of the EGR valve.

According to the first disclosure, the control device compares the comparison-target pressure being the higher one of the target supercharge pressure and the actual supercharge pressure with the exhaust gas pressure. When the comparison-target pressure is lower than the exhaust gas pressure, the control device permits the EGR. On the other hand, when the comparison-target pressure is higher than the exhaust gas pressure, the control device prohibits the EGR and fully closes the EGR valve. As a result, it is possible to certainly prevent the intake gas from flowing back through the EGR passage. Since the amount of fresh air introduced into a cylinder does not decrease, the performance degradation such as torque reduction and the like can be prevented. Furthermore, by using the higher one of the target supercharge pressure and the actual supercharge pressure as the comparison-target pressure, it is possible to suppress probability of occurrence of erroneous determination when there is an error in a value of the target supercharge pressure or the actual supercharge pressure.

According to the second disclosure, the catalytic converter is disposed downstream of a position at which the EGR passage and the exhaust passage are connected to each other. If the intake gas flows back through the EGR passage to be output to the exhaust passage, the intake gas and unburned hydrocarbons are introduced to the catalytic converter. This causes over-temperature and thus melting of the catalytic converter. According to the second disclosure, the intake gas is prevented from flowing back through the EGR passage, and thus the over-temperature and melting of the catalytic converter also are prevented.

According to the third disclosure, it is possible to prevent the back-flow of the intake gas in the EGR passage that may occur during acceleration of the vehicle.

According to the fourth disclosure, when starting the prohibition processing, the control device immediately sets the target opening degree of the EGR valve to zero. As a result, the EGR valve is fully closed in the fastest manner. It is thus possible to more certainly prevent the back-flow of the intake gas in the EGR passage.

According to the fifth disclosure, it is possible to prevent the back-flow of the intake gas in the EGR passage that may occur during deceleration of the vehicle.

According to the sixth disclosure, when starting the EGR, the control device gradually increases the target opening degree of the EGR valve. It is thus possible to prevent an EGR gas amount from becoming excessive.

EMBODIMENTS

Embodiments of the present disclosure will be described below with reference to the attached drawings.

1. Configuration Example of Internal-Combustion Engine

Figure 1:
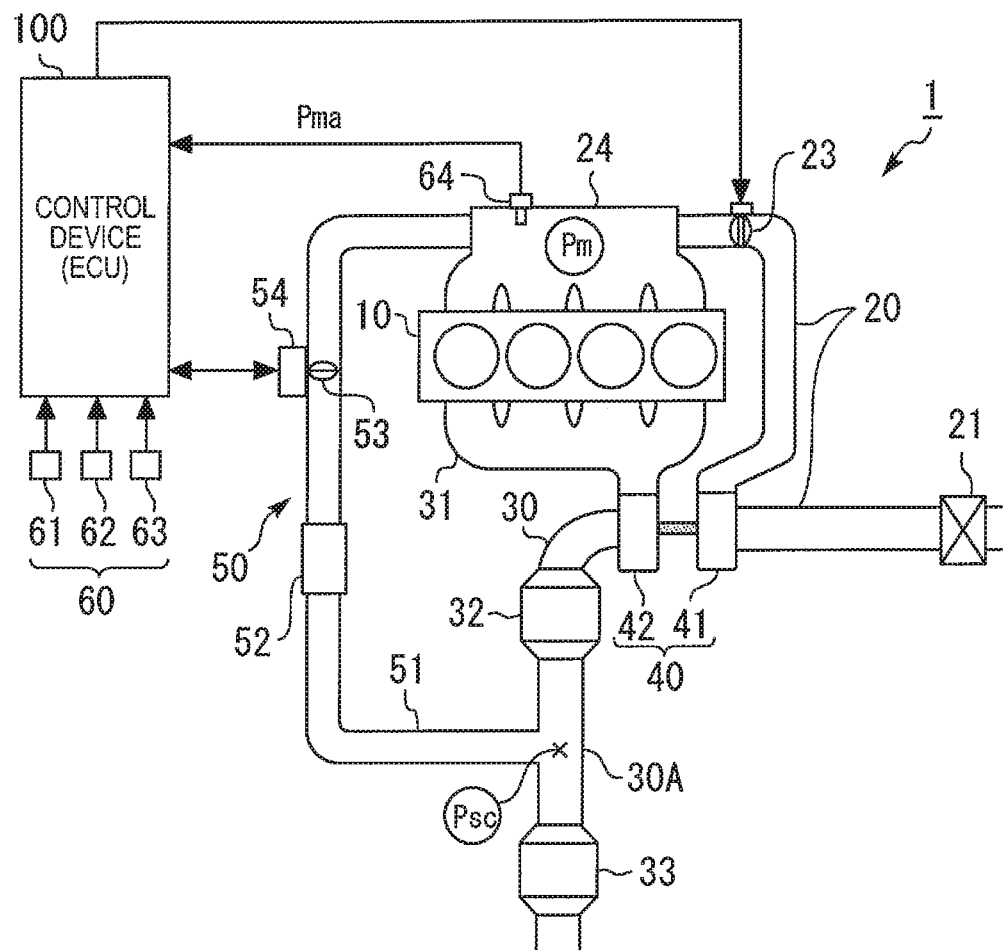
FIG. 1 is a schematic diagram showing a configuration example of an internal-combustion engine according to an embodiment of the present disclosure.

FIG. 1 is a schematic diagram showing a configuration example of an internal-combustion engine 1 according to the present embodiment. The internal-combustion engine 1 is mounted on a vehicle. The internal-combustion engine I includes an engine main unit 10, an intake passage 20, an exhaust passage 30, a supercharger 40, an EGR device 50, a sensor group 60, and a control device 100, as main components.

The engine main unit 10 includes a cylinder (combustion chamber) in which combustion is performed.

The intake passage 20 is used for supplying intake gas to the cylinder of the engine main unit 10 and arranged upstream side of the engine main unit 10. An air cleaner 21 is provided at a most upstream section of the intake passage 20. A compressor 41 of the supercharger 40 is provided downstream of the air cleaner 21. A throttle valve 23 is provided in the intake passage 20 downstream of the compressor 41. An intake manifold 24 is provided downstream of the throttle valve 23. The intake manifold 24 is connected so as to introduce the intake gas into each cylinder of the engine main unit 10.

The exhaust passage 30 is used for exhausting exhaust gas from the cylinder of the engine main unit 10 and arranged downstream side of the engine main unit 10. More specifically, an exhaust manifold 31 is connected to an exhaust opening of each cylinder of the engine main unit 10. A turbine 42 of the supercharger 40 is provided downstream of the exhaust manifold 31. A front catalytic converter 32 is disposed in the exhaust passage 30 downstream of the turbine 42. In addition, a rear catalytic converter 33 is disposed in the exhaust passage 30 downstream of the front catalytic converter 32. For example, the front catalytic converter 32 is a start catalytic converter (S/C), and the rear catalytic converter 33 is an underfloor catalytic converter (U/F).

An output shaft of the turbine 42 is connected to the compressor 41 on the intake side. When the turbine 42 is rotated by an exhaust gas flow from the engine main unit 10, the compressor 41 also is rotated to compress the intake gas. In this manner, the supercharger 40 is able to increase a pressure of the intake gas to higher than an atmospheric pressure. It should be noted that although the supercharger 40 in the example shown in FIG. 1 is a turbocharger, another supercharging-type supercharger 40 may be used instead.

The EGR device 50 is provided for performing "EGR (Exhaust Gas Recirculation)" that recirculates a portion of the exhaust gas flowing in the exhaust passage 30 to the intake passage 20. In the example shown in FIG. 1, the EGR device 50 takes in a portion of the exhaust gas from the exhaust passage 30 between the front catalytic converter 32 and the rear catalytic converter 33. Then, the EGR device 50 returns the taken exhaust gas, as an EGR gas, back to the intake manifold 24 downstream of the compressor 41.

More specifically, an EGR passage 51 is provided as a channel for the EGR gas. One end of the EGR passage 51 is connected to a connecting point 30A located at the exhaust passage 30 between the front catalytic converter 32 and the rear catalytic converter 33. The other end of the EGR passage 51 is connected to the intake manifold 24 downstream of the compressor 41. An EGR cooler 52 for cooling the EGR gas and an EGR valve 53 for adjusting a flow rate of the EGR gas are provided in the EGR passage 51. An EGR actuator 54 is configured to be able to change an opening degree of the EGR valve 53. By changing the opening degree of the EGR. valve 53, it is possible to adjust the amount of EGR gas flowing through the EGR passage 51.

The sensor group 60 detects an operating state of the internal-combustion engine 1 and sends the detected information to the control device 100. For example, the sensor group 60 includes an engine rotation sensor 61, an atmospheric pressure sensor 62, an accelerator position sensor 63, and an intake pressure sensor 64. The engine rotation sensor 61 detects an engine rotational speed NE and sends the detected information to the control device 100. The atmospheric pressure sensor 62 detects an atmospheric pressure Pat and sends the detected information to the control device 100. The accelerator position sensor 63 detects an accelerator opening degree AP and sends the detected information to the control device 100. The intake pressure sensor 64 detects an intake gas pressure (i.e. an actual supercharge pressure Pma) in the intake manifold 24 and sends the detected information to the control device 100.

The control device 100 controls an operation of the internal-combustion engine 1. Typically, the control device 100 is a microcomputer provided with a processor, a memory device, and an input/output interface. The control device 100 is also called an ECU (Electronic Control Unit). The control device 100 receives the detected information from the sensor group 60 and controls a variety of actuators based on the detected information to control the operation of the internal-combustion engine 1. In particular, the control device 100 performs EGR control by controlling the EGR actuator 54 to adjust the opening degree of the EGR valve 53.

2. Outline of EGR Control

Figure 2:
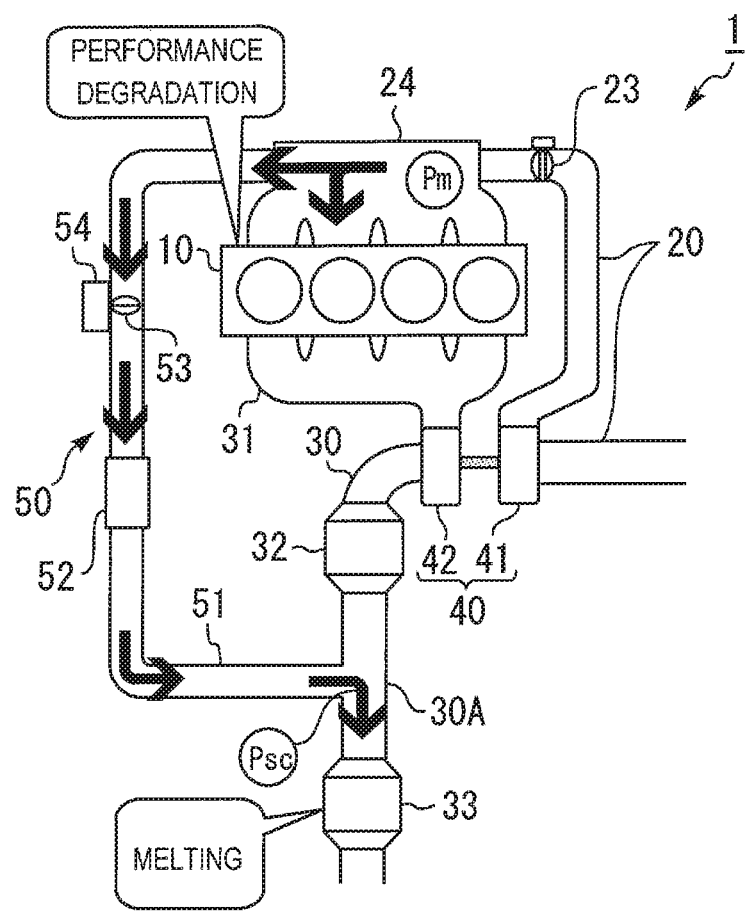
FIG. 2 is a schematic diagram for explaining a problem.

FIG. 2 is a schematic diagram for explaining a problem. As described above, the EGR passage 51 connects between the connecting point 30A of the exhaust passage 30 and the intake manifold 24 of the intake passage 20 through the EGR valve 53. A gas pressure in the exhaust passage 30 (at the connecting point 30A) is hereinafter referred to as an "exhaust gas pressure Psc". A gas pressure in the intake manifold 24 downstream of the compressor 41 of the supercharger 40 is hereinafter referred to as a "supercharge pressure Pm".

Here, let us consider a situation where the supercharge pressure Pm is higher than the exhaust gas pressure Psc. For example, when the operation state of the internal-combustion engine 1 makes a transition from an NA region to a supercharge region during acceleration of the vehicle, there is a possibility that the supercharge pressure Pm becomes higher than the exhaust gas pressure Psc. As another example, in an environment where the atmospheric pressure Pat is low and an air density is low (e.g. in a high altitude environment), there is a possibility that the supercharge pressure Pm becomes higher than the exhaust gas pressure Psc.

If the EGR valve 53 is open under such the situation where the supercharge pressure Pm is higher than the exhaust gas pressure Psc, a portion of the intake gas in the intake manifold 24 flows back through the EGR passage 51 to be output to the exhaust passage 30. In this case, the amount of fresh air introduced into the cylinder of the engine main unit 10 decreases, and thus performance degradation such as torque reduction and the like is caused.

Moreover, the intake gas (fresh air) flowed back through the EGR passage 51 and unburned hydrocarbons (HC) are introduced to the rear catalytic converter 33. This causes over-temperature (OT: Over Temperature) and thus melting of the rear catalytic converter 33, which is not preferable.

In order to solve the problem described above, the present embodiment proposes EGR control that can prevent the intake gas from flowing back through the EGR passage 51. More specifically, in order to prevent the back-flow, opening/closing of the EGR valve 53 is controlled based on a result of comparison between the supercharge pressure Pm and the exhaust gas pressure Psc.

In particular, according to the present embodiment, two kinds of values are used as the supercharge pressure Pm. The first one is a "target supercharge pressure Pmt" which is a target value of the supercharge pressure Pm. This target supercharge pressure Pint is determined by the control device 100 based on the operating state of the internal-combustion engine I. The second one is an "actual supercharge pressure Pma" which is an actual measurement value of the supercharge pressure Pm. This actual supercharge pressure Pma is detected by the intake pressure sensor 64. A higher one of the target supercharge pressure Pmt and the actual supercharge pressure Pma is compared with the exhaust gas pressure Psc. The higher one of the target supercharge pressure Pint and the actual supercharge pressure Pma is hereinafter referred to as a "comparison-target pressure Pine".

Figure 3:
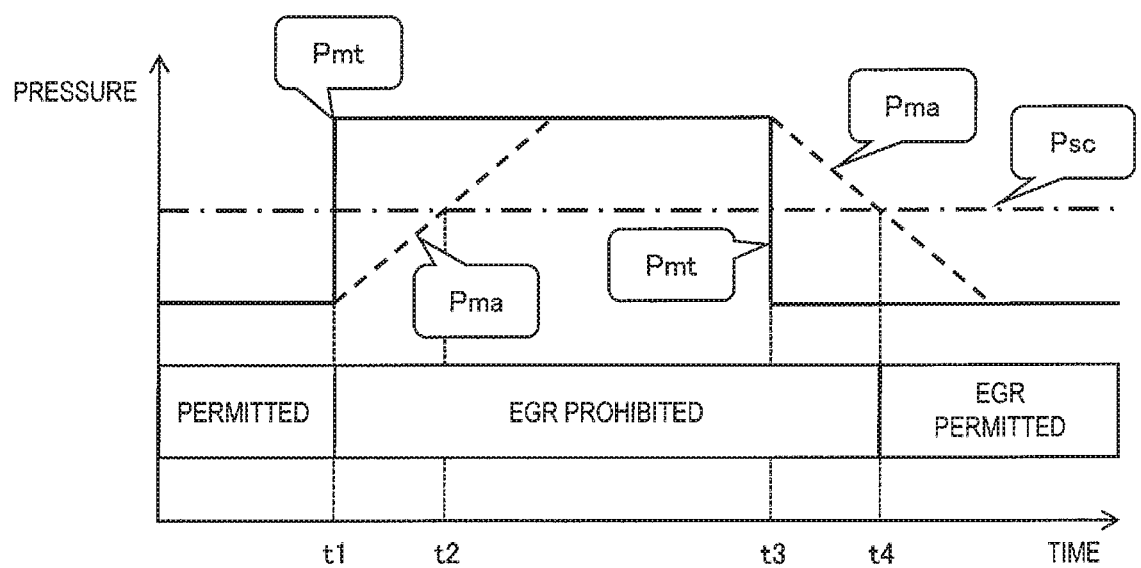
FIG. 3 is a timing chart for explaining an outline of EGR control in the internal-combustion engine according to the embodiment of the present disclosure.

FIG. 3 is a timing chart for explaining an outline of the EGR control according to the present embodiment.

Before a time t1, both of the target supercharge pressure Pmt and the actual supercharge pressure Pma are lower than the exhaust gas pressure Psc. That is, the comparison-target pressure Pmc is lower than the exhaust gas pressure Psc (i.e. Pmc<Psc). In this case, the EGR is permitted. When the EGR is permitted, it is permitted to Open the EGR valve 53 to perform the EGR if required.

At the time t1, the target supercharge pressure Pmt increases to be higher than the exhaust gas pressure Psc. On the other hand, the actual supercharge pressure Pma gradually increases after the time t1 and becomes higher than the exhaust gas pressure Psc at a time t2 after the time t1. According to the present embodiment, even when the actual supercharge pressure Pma is lower than the exhaust gas pressure Psc, the EGR is prohibited and the EGR valve 53 is fully closed when the target supercharge pressure Pmt is higher than the exhaust gas pressure Psc. In other words, when the comparison-target pressure Pmc is higher than the exhaust gas pressure Psc (i.e. Pmc>Psc), the EGR is prohibited and the EGR valve 53 is fully closed. As a result, it is possible to certainly prevent the back-flow of the intake gas in the EGR passage 51.

For a while after the time t1, the comparison-target pressure Pmc is higher than the exhaust gas pressure Psc and the EGR continues to be prohibited. That is, the EGR valve 53 continues to be fully closed.

At a time t3, the target supercharge pressure Pmt decreases to be lower than the exhaust gas pressure Psc. On the other hand, the actual supercharge pressure Pma gradually decreases after the time t3 and becomes lower than the exhaust gas pressure Psc at a time t4 after the time t3. Even when the target supercharge pressure Pmt is lower than the exhaust gas pressure Psc, the EGR is prohibited when the actual supercharge pressure Pma is higher than the exhaust gas pressure Psc. In other words, when the comparison-target pressure Pmc is higher than the exhaust gas pressure Psc (i.e. Pmc>Psc), the EGR is prohibited.

At the time t4, the comparison-target pressure Pmc (the actual supercharge pressure Pma, here) becomes lower than the exhaust gas pressure Psc. As a result, the EGR is permitted. When the EGR is permitted, it is permitted to open the EGR valve 53 to perform the EGR if required. Since the EGR valve 53 is opened after waiting for the time t4 at which the actual supercharge pressure Pma becomes lower than the exhaust gas pressure Psc, it is possible to certainly prevent the back-flow of the intake gas in the EGR passage 51.

According to the present embodiment, as described above, two kinds of pressures, namely the target supercharge pressure Pmt and the actual supercharge pressure Pma are used as the supercharge pressure Pm downstream of the supercharger 40. Then, the comparison-target pressure Pmc being the higher one of the target supercharge pressure Pmt and the actual supercharge pressure Prim is compared with the exhaust gas pressure Psc. When the comparison-target pressure Pmc is lower than the exhaust gas pressure Psc (i.e. Pmc<Psc), the EGR is permitted. On the other hand, when the comparison-target pressure Pmc is higher than the exhaust gas pressure Psc (i.e. Pmc>Psc), the EGR is prohibited and the EGR valve 53 is fully closed. As a result, it is possible to certainly prevent a portion of the intake gas from flowing back through the EGR passage 51. Since the amount of fresh air introduced into the cylinder of the engine main unit 10 does not decrease, the performance degradation such as torque reduction and the like is prevented. Moreover, the over-temperature and melting of the rear catalytic converter 33 are prevented.

Furthermore, by using the higher one of the target supercharge pressure Pmt and the actual supercharge pressure Pma as the comparison-target pressure Pmc, the following effect can be obtained. For example, if the intake pressure sensor 64 fails, there is a possibility that an error occurs in the detected value of the actual supercharge pressure Pma. In that case, if the permission or prohibition of the EGR is determined based only on the actual supercharge pressure Pma, the determination is likely to result in error. According to the present embodiment, since the higher one of the target supercharge pressure Pant and the actual supercharge pressure Pma is used as the comparison-target pressure Pmc, it is possible to prevent such the erroneous determination at least in a period from the time t1 to the time t3. The same applies to a case where there is an error in the value of the target supercharge pressure Pmt. That is to say, according to the present embodiment, it is possible to prevent occurrence of the erroneous determination at least in the steady state.

3. EGR Control by Control Device
3-1. Configuration Example for EGR Control

Figure 4:
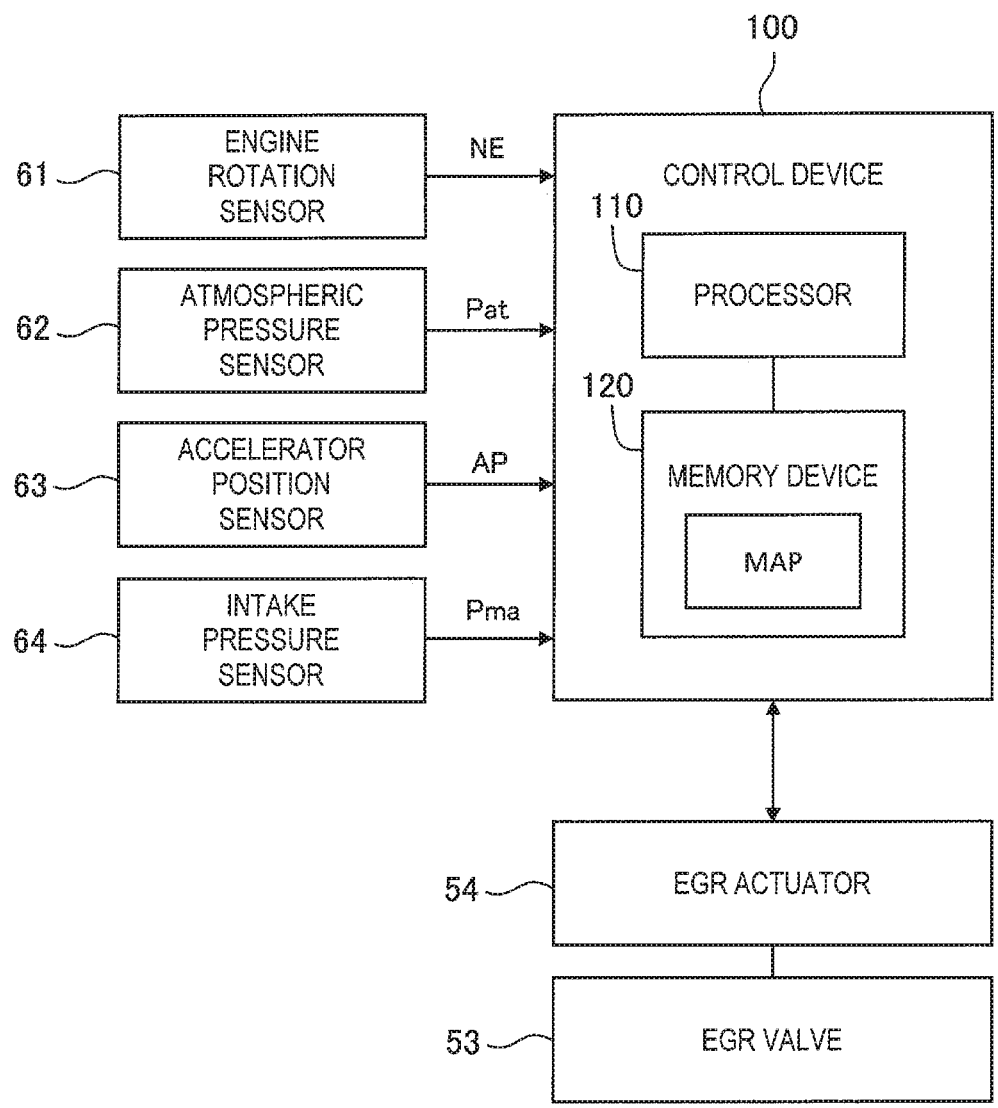
FIG. 4 is a block diagram for explaining the EGR control by a control device of the internal-combustion engine according to the embodiment of the present disclosure.

FIG. 4 is a block diagram for explaining the EGR control by the control device 100 of the internal-combustion engine 1 according to the present embodiment. The control device 100 is provided with a processor 110 and a memory device 120. The EGR control according to the present embodiment is realized by the processor 110 executing a control program stored in the memory device 120.

More specifically, the control device 100 receives, from the sensor group 60, the detected information of the engine rotational speed NE, the atmospheric pressure Pat, the accelerator opening degree AP, the actual supercharge pressure Pma, and so forth. Based on the detected information, the control device 100 acquires the comparison-target pressure Pane and the exhaust gas pressure Psc. When acquiring the exhaust gas pressure Psc, the control device 100 may refer to an exhaust gas pressure map MAP that is created in advance.

Figure 5:
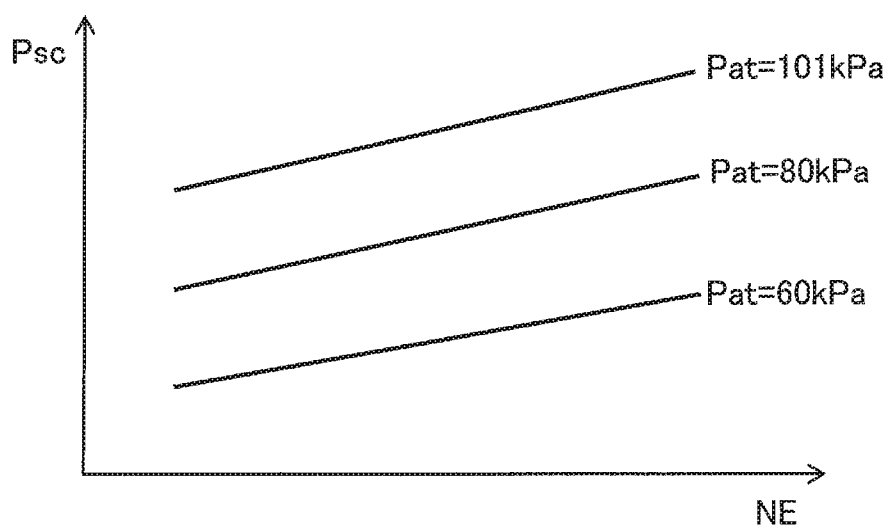
FIG. 5 is a conceptual diagram for explaining an exhaust gas pressure map in the embodiment of the present disclosure.

FIG. 5 is a conceptual diagram for explaining the exhaust gas pressure map MAP. A horizontal axis represents the engine rotational speed NE, and a vertical axis represents the exhaust gas pressure Psc. As the engine rotational speed NE becomes higher, the exhaust gas pressure Psc becomes higher as well. In addition, FIG. 5 shows relationships between the exhaust gas pressure Psc and the engine rotational speed NE in respective cases of plural different atmospheric pressures Pat. As the atmospheric pressure Pat becomes lower, the exhaust gas pressure Psc becomes lower as well. In this manner, the exhaust gas pressure Psc is expressed as a function of the engine rotational speed NE and the atmospheric pressure Pat. The exhaust gas pressure map MAP is a map defining such the function. The exhaust gas pressure map MAP is created in advance and stored in the memory device 120 of the control device 100. The control device 100 can estimate the exhaust gas pressure Psc by using the exhaust gas pressure map MAP.

The control device 100 makes a comparison between the comparison-target pressure Pmc and the exhaust gas pressure Psc to determine, based on the comparison result, whether to permit or prohibit the EGR. When prohibiting the EGR, the control device 100 fully closes the EGR valve 53. Here, the control device 100 controls the opening degree of the EGR valve 53 through the EGR actuator 54. More specifically, the control device 100 outputs an instruction indicating a target opening degree of the EGR valve 53 to the EGR actuator 54. In accordance with the instruction, the EGR actuator 54 controls the opening degree of the EGR valve 53 to be the target opening degree.

3-2. Processing flow of EGR control

Figure 6:
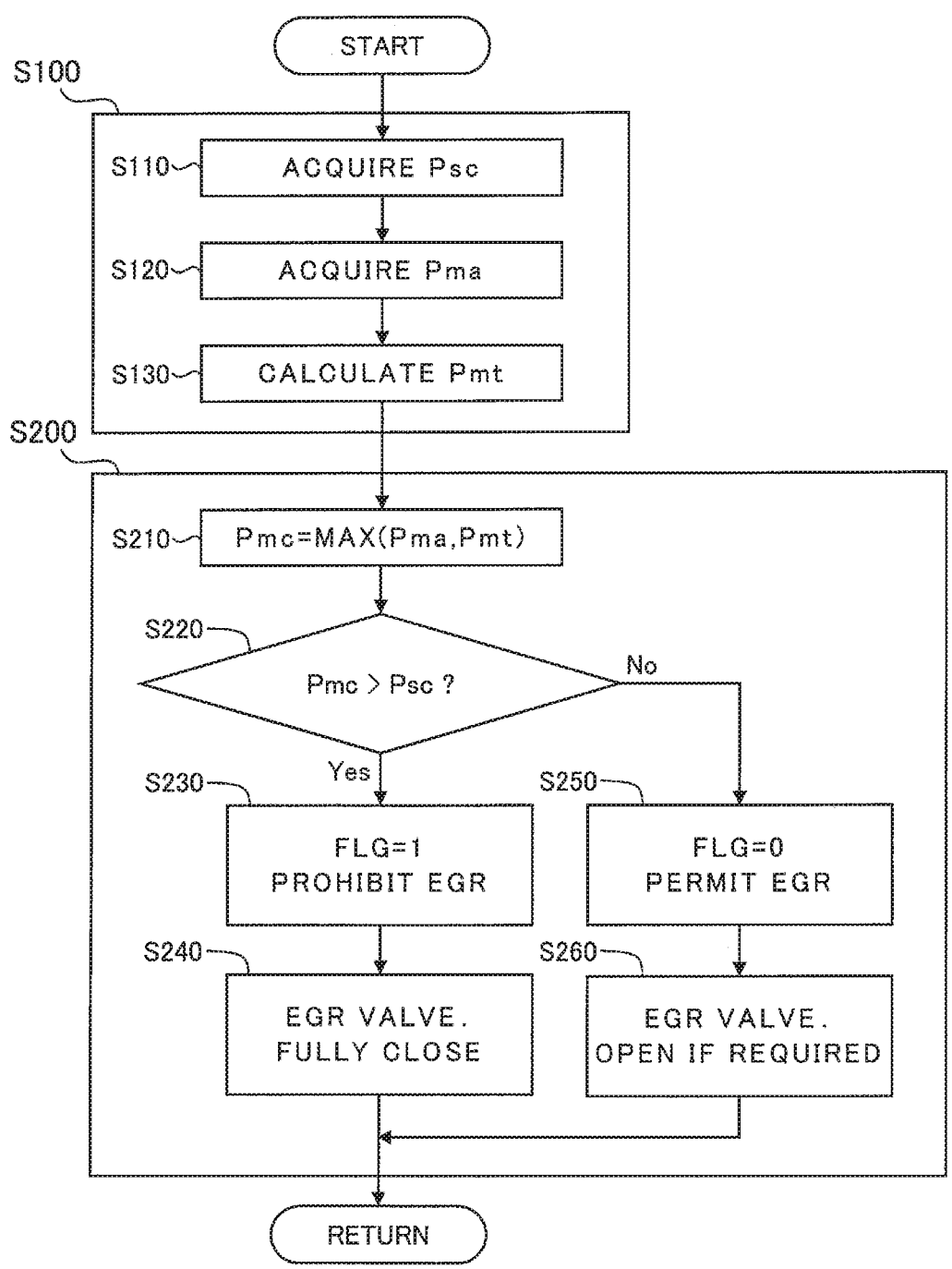
FIG. 6 is a flow chart showing the EGR control by the control device of the internal-combustion engine according to the embodiment of the present disclosure.

FIG. 6 is a flow chart showing the EGR control according to the present embodiment. The flow shown in FIG. 6 is executed every certain cycle.

Step S100: Acquisition Processing

At Step S100, the control device 100 acquires various pressures necessary for the EGR control. More specifically, the control device 100 acquires the exhaust gas pressure Psc in the exhaust passage 30 (Step S110). For example, the control device 100 uses the exhaust gas pressure map MAP (see FIG. 5) to estimate the exhaust gas pressure Psc. As described above, input parameters to the exhaust gas pressure map MAP include the engine rotational speed NE and the atmospheric pressure Pat. The engine rotational speed NE is detected by the engine rotation sensor 61. The atmospheric pressure Pat is detected by the atmospheric pressure sensor 62. By taking the atmospheric pressure Pat into consideration, it is possible to estimate the exhaust gas pressure Psc with high precision even in a high altitude environment where the atmospheric pressure Pat is low.

Moreover, the control device 100 acquires the actual supercharge pressure Pma (Step S120). The actual supercharge pressure Pma is detected by the intake pressure sensor 64. Furthermore, the control device 100 acquires the target supercharge pressure Pmt (Step S130). More specifically, the control device 100 calculates the target supercharge pressure Pmt based on the operating state of the internal-combustion engine 1. A method of calculating the target supercharge pressure Pint depends on design and is exemplified by various examples. For example, the control device 100 calculates the target supercharge pressure Pmt based on the accelerator opening degree AP. The accelerator opening degree AP is detected by the accelerator position sensor 63.

Step S200: EGR Control Processing

At Step S200, the control device 100 performs the EGR control based on the various pressures acquired at Step S100. The control device 100 first sets a higher one of the actual supercharge pressure Pma and the target supercharge pressure Pmt as the comparison-target pressure Pmc (Step S210). Then, the control device 100 makes a comparison between the comparison-target pressure Pmc and the exhaust gas pressure Psc to determine whether or not the comparison-target pressure Pmc is higher than the exhaust gas pressure Psc (Step S220).

When the comparison-target pressure Pmc is higher than the exhaust gas pressure Psc (Step S220; Yes), the control device 100 performs "prohibition processing". More specifically, the control device 100 sets a determination flag FLG to "1" (Step S230). When the determination flag FLG is "1", the EGR is prohibited. Furthermore, the control device 100 fully closes the EGR valve 53 in order to prevent the hack-flow of the intake gas in the EGR passage 51 (Step S240).

On the other hand, when the comparison-target pressure Pmc is lower than the exhaust gas pressure Psc (Step S220; No), the control device 100 performs "permission processing". More specifically, the control device 100 sets the determination flag FLG to "0" (Step S250). When the determination flag FLG is "0", the EGR is permitted. When the EGR is permitted, the control device 100 can open the EGR valve 53 to perform the EGR if required (Step S260).

3-3. Example of EGR Control

Figure 7:
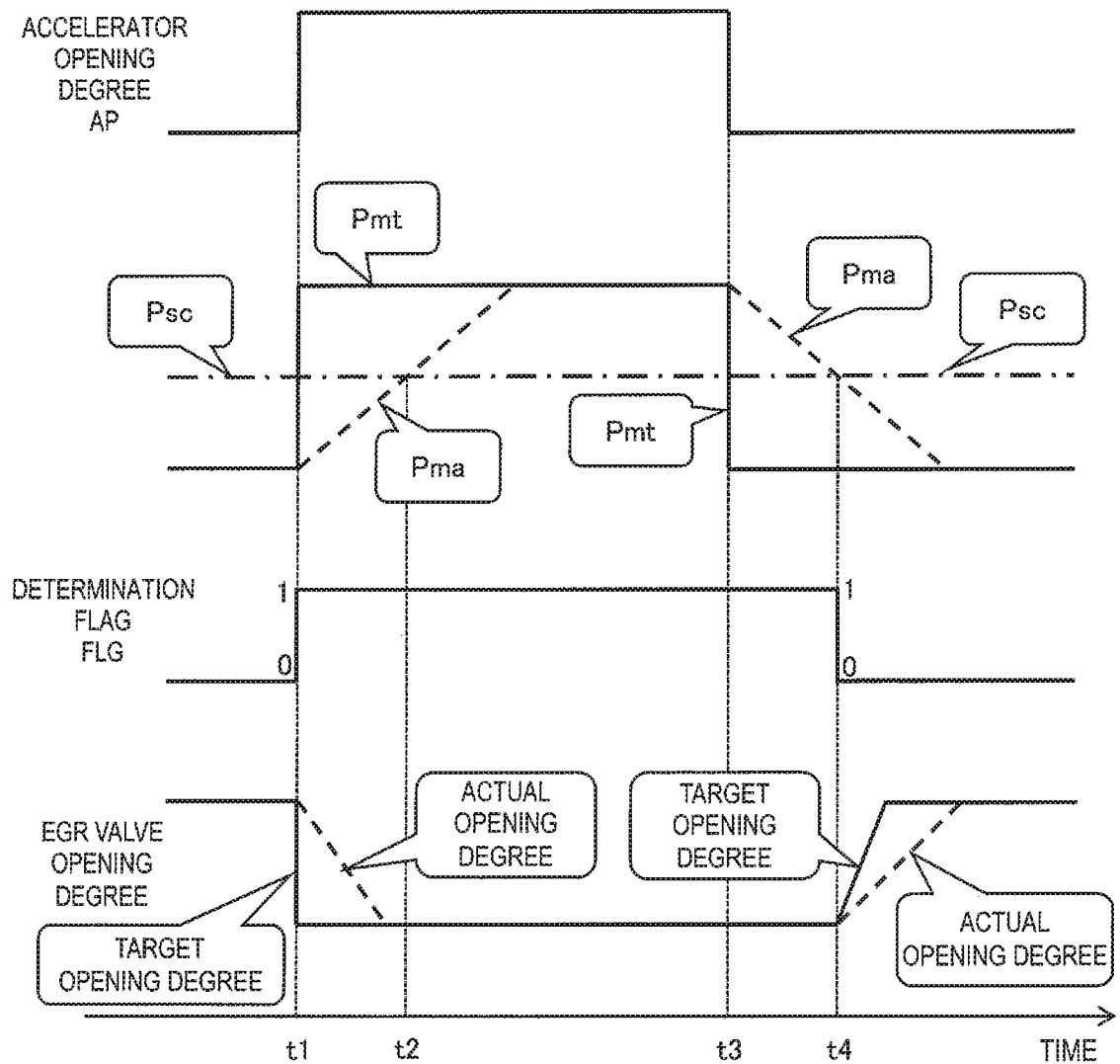
FIG. 7 is a timing chart showing an example of the EGR control in the internal-combustion engine according to the embodiment of the present disclosure.

FIG. 7 is a timing chart showing an example of the EGR control according to the present embodiment. Respective time changes of the accelerator opening degree AP, the various pressures, the determination flag FLG, and the opening degree of the EGR valve 53 are shown in FIG. 7. Two kinds of opening degrees, that is, a target opening degree and an actual opening degree are shown as the opening degree of the EGR valve 53.

At a time t1, the vehicle on which the internal-combustion engine 1 is mounted starts to accelerate. The accelerator opening degree AP increases and the target supercharge pressure Pmt increases accordingly. Although the actual supercharge pressure Pma is still lower than the exhaust gas pressure Psc, the target supercharge pressure Pmt becomes higher than the exhaust gas pressure Psc. That is, the comparison-target pressure Pmc becomes higher than the exhaust gas pressure Psc. Therefore, the control device 100 sets the determination flag FLG to "1" and starts the prohibition processing.

When starting the prohibition processing, the control device 100 immediately decreases the target opening degree of the EGR valve 53 to zero. Although the actual. opening degree of the EGR valve 53 changes later than the target opening degree, setting the target opening degree immediately to zero makes it possible to close the EGR valve 53 as early as possible. In other words, it is possible to fully close the EGR valve 53 in the fastest manner. It is thus possible to more certainly prevent the back-flow of the intake gas in the EGR passage 51.

The actual supercharge pressure Pma gradually increases after the time t1. At a time t2 after the time t1, the actual supercharge pressure Pma becomes higher than the exhaust gas pressure Psc. However, the prohibition processing has already started at the previous time t1. There is no change in the determination flag FLG and so forth at the time t2. After that, the actual supercharge pressure Pma becomes constant (i.e. steady state). In this steady state, the EGR continues to be prohibited and the EGR valve 53 continues to be fully closed.

At a time t3, the vehicle on which the internal-combustion engine 1 is mounted starts to decelerate. The accelerator opening degree AP decreases and the target supercharge pressure Pmt decreases accordingly. Although the target supercharge pressure Pmt becomes lower than the exhaust gas pressure Psc, the actual supercharge pressure Pma is still higher than the exhaust gas pressure Psc. That is, the comparison-target pressure Pmc is still higher than the exhaust gas pressure Psc. Therefore, there is no change in the determination flag FLG and so forth. The EGR continues to be prohibited and the EGR valve 53 continues to be fully closed.

The actual supercharge pressure Pma gradually decreases after the time t3. At a time t4 after the time t3, the actual supercharge pressure Pma becomes lower than the exhaust gas pressure Psc. That is, the comparison-target pressure Pine becomes lower than the exhaust gas pressure Psc. Therefore, the control device 100 sets the determination as FLG to "0" and permits the EGR.

When the EGR is permitted, the control device 100 is permitted to open the EGR valve 53 to start the EGR. When starting the EGR, it is preferable to gradually open the EGR valve 53 in order to prevent an EGR gas amount from becoming excessive. For that purpose, it is preferable that the control device 100 gradually increases the target opening degree of the EGR valve 53 as shown in FIG. 7.

3-4. Effects

According to the present embodiment, as described above, the control device 100 compares the comparison-target pressure Pmc being the higher one of the target supercharge pressure Pmt and the actual supercharge pressure Pma with the exhaust gas pressure Psc. When the comparison-target pressure Pmc is lower than the exhaust gas pressure Psc (i.e. Pmc<Psc), the control device 100 permits the EGR. On the other hand, when the comparison-target pressure Pmc is higher than the exhaust gas pressure Psc (i.e. Prue>Psc), the control device 100 prohibits the EGR and fully closes the EGR valve 53. As a result, it is possible to certainly prevent a portion of the intake gas from flowing back through the EGR passage 51. Since the amount of fresh air introduced into the cylinder of the engine main unit 10 does not decrease, the performance degradation such as torque reduction and the like is prevented. Moreover, the over-temperature and melting of the rear catalytic converter 33 are prevented.

Furthermore, by using the higher one of the target supercharge pressure Pmt and the actual supercharge pressure Pma as the comparison-target pressure Pmc, it is possible to suppress probability of occurrence of the erroneous determination when there is an error in the value of the target supercharge pressure Pmt or the actual supercharge pressure Pma. It is possible to prevent the erroneous determination at least in the steady state.

4. Modification Examples 4-1. First Modification Example

Figure 8:
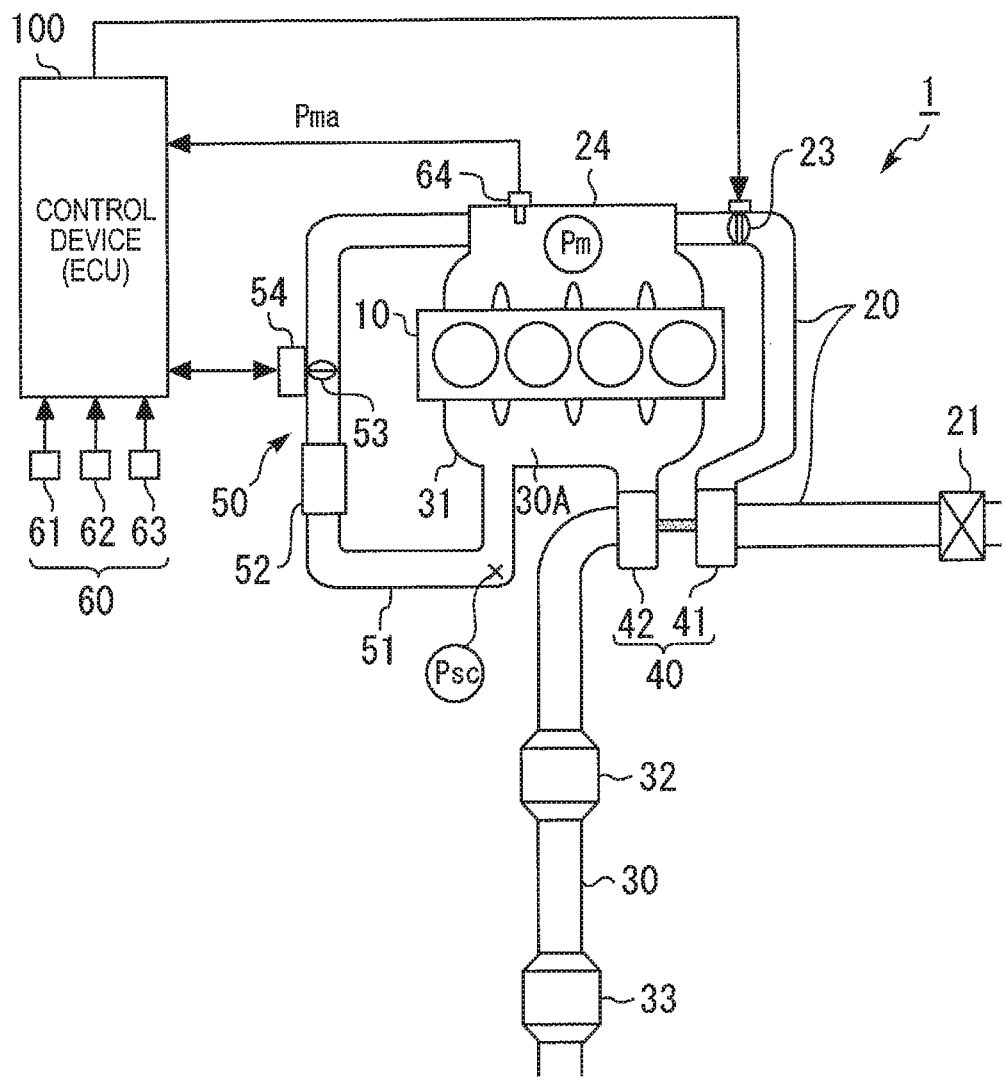
FIG. 8 is a schematic diagram showing a first modification example of the internal-combustion engine according to the embodiment of the present disclosure.

FIG. 8 is a schematic diagram showing a first modification example of the internal-combustion engine 1 according to the present embodiment. An overlapping description with the foregoing will be omitted as appropriate. In the first modification example, the EGR passage 51 is connected to the exhaust passage 30 upstream of the turbine 42 of the supercharger 40, for example to the exhaust manifold 31. That is, the EGR device 50 recirculates the EGR gas from the exhaust passage 30 upstream of the turbine 42 to the intake passage 20 downstream of the compressor 41. The EGR by such the configuration is called HPL (High Pressure Loop)-EGR in some cases. Also in such the configuration, the phenomenon that a portion of the intake gas flows back through the EGR passage 51 can occur. Therefore, the EGR control according to the present embodiment is useful.

4-2. Second Modification Example

Figure 9:
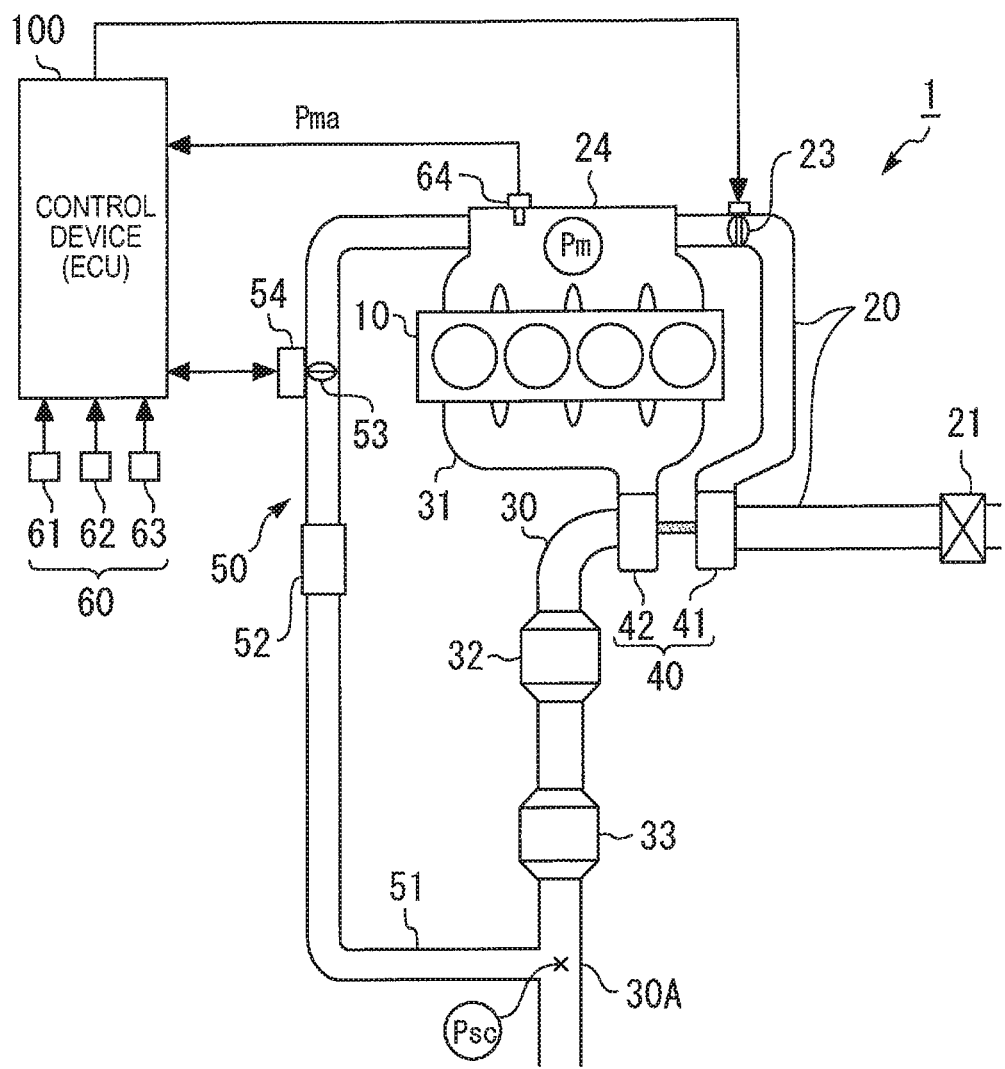
FIG. 9 is a schematic diagram showing a second modification example of the internal-combustion engine according to the embodiment of the present disclosure.

FIG. 9 is a schematic diagram showing a second modification example of the internal-combustion engine 1 according to the present embodiment. An overlapping description with the foregoing will be omitted as appropriate. In the second modification example, the FOR passage 51 is connected to the exhaust passage 30 downstream of the rear catalytic converter 33. In this case, the over-temperature and melting of the rear catalytic converter 33 are not caused when a portion of the intake gas flows back through the EGR passage 51. However, the performance degradation due to decrease in the amount of fresh air introduced into the cylinder of the engine main unit 10 can occur. Therefore, the EGR control according to the present embodiment is useful.

4-3. Third Modification Example

Figure 10:
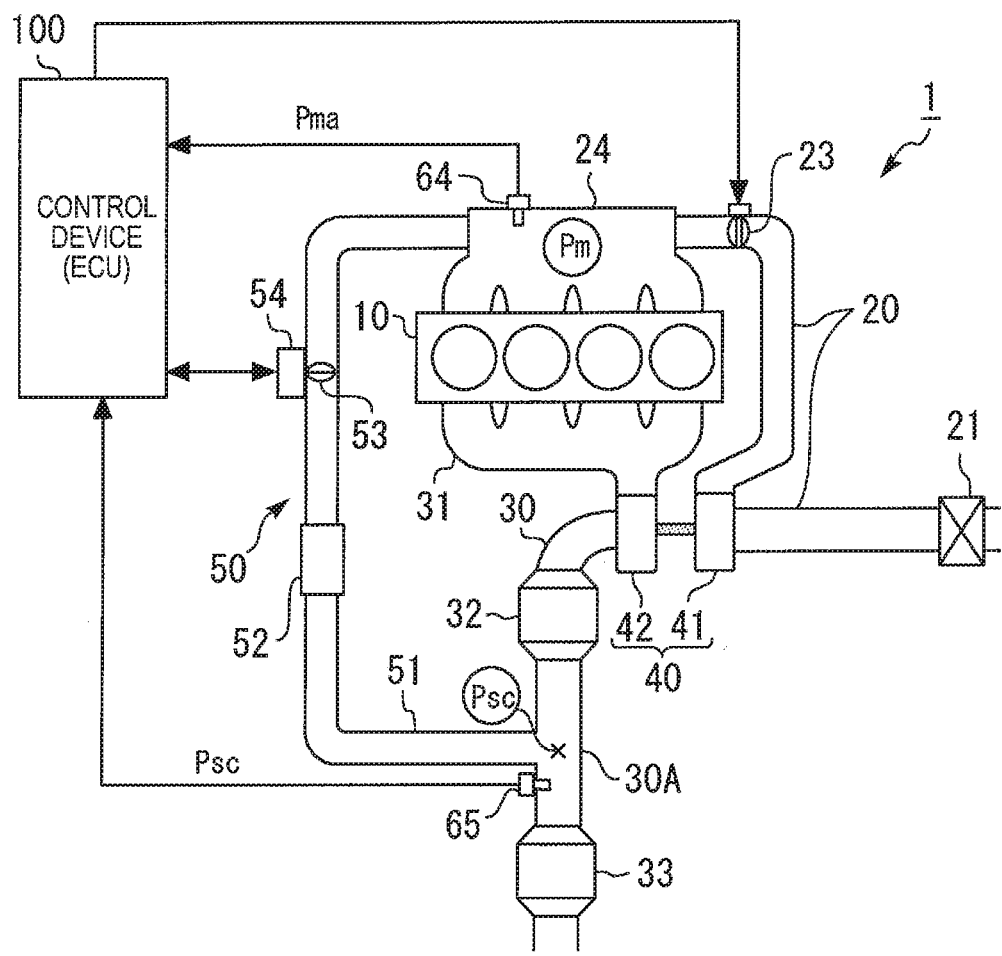
FIG. 10 is a schematic diagram showing a third modification example of the internal-combustion engine according to the embodiment of the present disclosure.

FIG. 10 is a schematic diagram showing a third modification example of the internal-combustion engine 1 according to the present embodiment. An overlapping description with the foregoing will be omitted as appropriate. In the third modification example, an exhaust gas pressure sensor 65 is provided in the exhaust passage 30. The exhaust gas pressure sensor 65 detects the exhaust gas pressure Psc in the exhaust passage 30 and sends the detected information to the control device 100. At Step S110 in FIG. 6, the control device 100 acquires the exhaust gas pressure Psc from the detected information. In the case of the present modification example, there is no need to use the exhaust gas pressure map MAP.

It should be noted that the third modification example can be combined with any of the above-described configurations shown in FIGS. 1, 8, and 9.

What is claimed is:

1. An internal-combustion engine comprising:
a supercharger;
an EGR passage connecting between an exhaust passage and an intake passage downstream of the supercharger through an EGR valve;
a control device that controls EGR that recirculates a portion of exhaust gas from the exhaust passage to the intake passage through the EGR passage; and
an intake pressure sensor that detects a supercharge pressure being a gas pressure in the intake passage downstream of the supercharger, wherein
a target value of the supercharge pressure is a target supercharge pressure,
the supercharge pressure detected by the intake pressure sensor is an actual supercharge pressure, and
the control device performs:
acquisition processing that acquires the target supercharge pressure, the actual supercharge pressure, and an exhaust gas pressure in the exhaust passage;
determination processing that makes a comparison between the exhaust gas pressure and a comparison-target pressure being a higher one of the target supercharge pressure and the actual supercharge pressure;
prohibition processing that prohibits the EGR and fully closes the EGR valve, when the comparison-target pressure is higher than the exhaust gas pressure; and
permission processing that permits the EGR, when the comparison-target pressure is lower than the exhaust gas pressure.

2. The internal-combustion engine according to claim 1, further comprising a catalytic converter disposed in the exhaust passage, wherein
the catalytic converter is disposed downstream of a position at which the EGR passage and the exhaust passage are connected to each other.

3. The internal-combustion engine according to claim 1, wherein
when the comparison-target pressure becomes higher than the exhaust gas pressure during acceleration of a vehicle on which the internal-combustion engine is mounted, the control device starts the prohibition processing.

4. The internal-combustion engine according to claim 3, wherein
when starting the prohibition processing, the control device immediately decreases a target opening degree of the EGR valve to zero.

5. The internal-combustion engine according to claim 1, wherein
when the comparison-target pressure becomes lower than the exhaust gas pressure during deceleration of a vehicle on which the internal-combustion engine is mounted, the control device opens the EGR valve to start the EGR.

6. The internal-combustion engine according to claim 5, wherein
when starting the EGR, the control device gradually increases a target opening degree of the EGR valve.

* * * * *